United States Patent [19]
Murao et al.

[11] Patent Number: 5,458,839
[45] Date of Patent: Oct. 17, 1995

[54] METHOD OF BLOW OR EXTRUSION MOLDING POLYOXYMETHYLENE RESIN

[75] Inventors: Toshiro Murao; Kaoru Yamamoto, both of Shizuoka, Japan; Gerhard Reuschel, Biblis-Nordheim; Dietrich Fleischer, Darmstadt, both of Germany

[73] Assignees: Polyplastics Co., Ltd., Japan; Hoechst Antiengesellschaft, Germany

[21] Appl. No.: 51,903

[22] Filed: Apr. 27, 1993

[30] Foreign Application Priority Data

Apr. 27, 1992 [JP] Japan .................. 4-107596

[51] Int. Cl.$^6$ .................. B29C 47/00; B29C 49/00
[52] U.S. Cl. .................. 264/177.1; 264/523
[58] Field of Search .................. 264/540, 537, 264/523, 177.14, 177.1; 528/241, 416, 503

[56] References Cited

U.S. PATENT DOCUMENTS

| | | | |
|---|---|---|---|
| 4,046,738 | 9/1977 | Sextro et al. | 260/67 FP |
| 4,814,424 | 3/1989 | Suzumori et al. | 528/249 |
| 5,344,911 | 9/1994 | Yamamoto et al. | 528/241 |

FOREIGN PATENT DOCUMENTS

| | | |
|---|---|---|
| 0121407 | 10/1984 | European Pat. Off. . |
| 0414060 | 8/1990 | European Pat. Off. . |
| 1420292 | 5/1969 | Germany . |

OTHER PUBLICATIONS

Abstract for Japanese Appln. 58-38713; vol. 7, No. 118 (C-167) (1263) May 21, 1983.

Abstract for Japanese Appln. 58-34819, vol. 7, No. 114 (C-166) (1259) May 18, 1993.

*Primary Examiner*—Christopher A. Fiorilla
*Attorney, Agent, or Firm*—Nixon & Vanderhye

[57] ABSTRACT

A process for efficiently producing a hollow molding or a sheet- or rod-shaped molding includes subjecting a composition containing a polyoxymethylene copolymer resin having substantially a linear molecular structure and a melt flow index (MI) value (190° C., 2160 g load) of 0.1 to 2.0 g/10 min to blow-molding or extrusion-molding operations. The preferred polyoxymethylene copolymer is prepared by copolymerizing trioxane as the principle monomer with a cyclic ether or cyclic formal comonomer in the presence of $1\times10^{-3}$ to $1\times10^{-2}$ molar % of a boron trifluoride catalyst or a coordination compound thereof, while regulating the chain-terminating or chain-transferring impurities in the reaction system to $1\times10^{-2}$ molar % or less, and then cooling the product obtained to a temperature of 45° or below within 30 seconds so as to deactivate the catalyst.

2 Claims, No Drawings

METHOD OF BLOW OR EXTRUSION MOLDING POLYOXYMETHYLENE RESIN

FIELD OF THE INVENTION

The present invention relates to a hollow molding or a sheet- or rod-shaped molding of a polyoxymethylene resin and a process for producing the same.

BACKGROUND OF THE INVENTION

Polyoxymethylene resins are extensively used as a representative engineering plastic in applications including electric and electronic parts, automobile parts and other working parts by virtue of an excellent balance among mechanical properties, chemical resistance, frictional properties, etc., and good moldability. However, in most cases, they have been molded by injection molding.

In recent years, there is an ever-increasing expectation of the application of the polyoxymethylene resins to hollow moldings, such as various containers including fuel tanks of automobiles, by taking advantage of excellent resistance thereof to chemicals, particularly organic solvents. Blow molding is generally used as an efficient method for the production of such hollow moldings. In order to successfully conduct the blow molding, it is necessary to satisfy a requirement that there should occur neither breaking nor uneven section of the molding due to drawdown of a parison, that is, the resin should have a sufficient melt tension. Since, however, polyoxymethylene resin exhibits generally poor melt tension, difficulty has been encountered with its blow-moldability. This is because the limitation of the molecular weight of the polyoxymethylene has made it difficult to produce a high-molecular weight polymer having a satisfactory melt tension. In order to cope with this difficulty, a proposal has been made on a method of improving the blow moldability through an increase in the melt tension by using a branched monomer in the polymerization to introduce a branched or crosslinked structure into the polymer (see, for example, Japanese Patent Publication-B No. 25114/1970). The branched or crosslinked polymer, however, has problems including a high liability to the formation of particulates in gel form in the molding, a deterioration in the appearance of the molding, a high fragility of the molding and a lack of toughness, so that it cannot satisfactorily attain the purpose.

On the other hand, the polyoxymethylene resin has found extensive applications in moldings having shapes with which injection molding cannot cope, such as rods, square timbers, hollow pipes and sheets. In this case as well, the occurrence of drawdown during extrusion molding due to unsatisfactory melt tension of the polyoxymethylene resin made it difficult to successfully conduct the extrusion melding, so that the application was limited to moldings having a relatively small size. Further, since the polyoxymethylene resin has a high crystallinity, voids are liable to occur in extrusion molding products, which brings about such problems that the mechanical strength deteriorates and at least part of the material cannot be used. The use of a polyoxymethylene copolymer resin having a high molecular weight and a suitable crystallinity is considered effective in solving the above-described problems. However, there is a limitation on the increase in the molecular weight of a linear polyoxymethylene resin from the viewpoint of the production technique, so that no linear polyoxymethylene copolymer resin particularly having a sufficiently high molecular weight and a suitable crystallinity is currently available in the art.

SUMMARY OF THE INVENTION

An object of the present invention is to solve the above-described problems and to provide a process for producing a hollow molding or a sheet- or rod-shaped molding of a polyoxymethylene resin at a high efficiency.

With a mind to the above-described object, the present inventors have made extensive studies on a process for producing a high-molecular weight polyoxymethylene copolymer resin and the effect of the process on the melt tension and blow moldability and, as a result, have found that the adoption of a specified polymerization method (conditions) enables a high-molecular weight polyoxymethylene copolymer to be produced and that a polyoxymethylene copolymer having a specified MI value among the high-molecular weight copolymers can provide particularly favorable melt viscosity (fluidity) and melt tension, improve the blow moldability and extrusion moldability and provide molding products excellent in various properties as well, which has led to the completion of the present invention.

Accordingly, the present invention relates to a process for producing a hollow molding or a sheet- or rod-shaped molding characterized by blow-molding or extrusion-molding a polyoxymethylene copolymer resin having substantially a linear molecular structure and a melt flow index (MI) value (190° C., 2160 g lead) of 0.1 to 2.0 g/10 min or a composition thereof, and moldings obtained thereby.

DETAILED DESCRIPTION OF THE INVENTION

The present invention is characterized in that a polyoxymethylene copolymer (hereinafter abbreviated to "POM") resin having a MI value of 0.1 to 2.0 g/10 min and substantially a linear molecular structure, particularly preferably a copolymer having a MI value of 0.1 to 1.5 and substantially a linear molecular structure, is used as the polyoxymethylene resin for blow molding or extrusion molding.

It is generally difficult to produce the abovedescribed linear POM copolymer having a high molecular weight by a known process and, at the present time, such a copolymer is not commercially available. However, the production thereof has become possible through studies conducted by the present inventors. A linear POM copolymer suitable for use in the present invention can be prepared by copolymerizing trioxane as the main monomer with a cyclic ether or cyclic formal as the comonomer in the presence of $1 \times 10^{31}$ 3 to $1 \times 10^{-2}$ molar %, based on the total monomers, of a catalyst comprising boron trifluoride or a coordination compound thereof while the total amount of impurities having a short-stopping effect or chain-transferring effect in the polymerization reaction system is regulated to $1 \times 10^{-2}$ molar % or less based on the total monomers and then cooling the product to a temperature of 45° C. or below within 30 sec to deactivate the catalyst.

Suitable examples of the comonomer include ethylene oxide, propylene oxide, 1,3-dioxolane, 1,4-butanediol formal, diethylene glycol formal and trioxepane, among which ethylene oxide, 1,3-dioxolane and 1,4-butanediol formal are particularly preferred. With considerations of the moldability and rigidity and solvent resistance of molding products derived from the behavior of crystallization, the amount of introduction of the above-described comonomers is 0.2 to 104 by weight, preferably 0.5 to 6% by weight based on the copolymer and regulated by varying the proportion of addition of the comonomer in the monomer.

Active impurities having a short-stopping effect or chain-transferring effect present in the polymerization reaction system during polymerization are water, alcohols (for example, methanol), acid or its esters (for example, formic acid or its esters), linear acetals having a low molecular weight (for example, methylal), etc. The total amount of impurities having a short-stopping effect or chain-transferring effect should be $1\times10^{-2}$ molar % or less, preferably $5\times10^{-3}$ molar % or less, based on the total monomers. When the content is excessively high, no high-molecular weight polymer having a MI value of 2.0 or less can be provided.

The concentration of the catalyst should be in the range of from $1\times10^{-3}$ to $1\times10^{-2}$ molar %, preferably in the range of from $1\times10^{-3}$ to $7\times10^{-3}$ molar %, based on the total nonomers. The use of the catalyst in an excessive amount makes it difficult to properly regulate the polymerization temperature and causes the decomposition reaction to become preferential, which is causative of a lowering in the molecular weight. On the other hand, when the amount of the catalyst is excessively small, the polymerization rate becomes so low that the yield of polymerization lowers, which leads to unfavorable results.

The polymerization temperature as well is a factor important to the production of a high-molecular weight POM resin, and is preferably between 60 and 105° C., preferably between 65° and 100° C.

Although any known polymerization method can be used for the polymerization, a polymerization method which is generally used in the art on a commercial scale and preferred in the present invention is a continuous bulk polymerization method wherein a liquid monomer is used and a solid bulk polymer is obtained with the progress of the polymerization.

Further, post-treatments, such as deactivation of the catalyst after the polymerization, are also important to the production of a high-molecular weight polymer and, in order to provide a polymer having a MI value of 2.0 or less, it is necessary to conduct such a post-treatment that an aqueous solution containing a deactivator is added to the reaction product discharged from a polymerizer and the mixture is cooled to a temperature of 45° C. or below in 30 sec or shorter.

A process for producing the above-described POM copolymer is described in detail in a prior application by the present inventors (see Japanese Patent Application No. 50597/1992).

If necessary, the crude polyoxymethylene copolymer resin produced by the above-described process is stabilized by a known method, such as the removal of an instable terminal portion by decomposition or blocking of the instable terminal with a stable material, necessary various stabilizers are incorporated therein, and the mixture is applied to blow molding or extrusion molding.

The stabilizer used herein may be at least one member selected from among hindered phenol compounds, nitrogenous compounds, hydroxides of alkali and alkaline earth metals, inorganic salts and carboxylic acid salts.

Further, at least one additive selected from among those commonly used in thermoplastic resins, for example, colorants, such as dyes and pigments, lubricants, nucleating agents, mold release agents, antistatic agents and other additives, such as surfactants or organic polymeric materials and inorganic or organic fibrous, powdery and flaky fillers, may be added according to need so far as the object of the present invention is not spoiled.

The POM used in the present invention is limited to those having a MI value of 0.1 to 2.0 among the POM copolymers having a high degree of polymerization produced by the above-described polymerization method. When the MI value is 2.0 or more, the melt tension is so unsatisfactory that no molding can be stably conducted. On the other hand, when the MI value is 0.1 or less, the melt viscosity is so high that the fluidity of the copolymer during blow molding and extrusion molding becomes poor unfavorably. The MI value can be regulated within the above-described production conditions by varying conditions such as the chain transfer agent or the amount of the catalyst.

Further, the POM copolymer resin used in the present invention is a POM substantially free from a branched or crosslinked structure, and can be generally prepared by polymerization substantially without use of a polyfunctional (bifunctional) monomer. Whether or not the branched or crosslinked structure is present can be determined based on a difference in the dependency of the melt viscosity on the shear rate. In a simple method used for this purpose, the above-described difference can be expressed in terms of the ratio of a MI value as measured under the above-described conditions to a MI value as measured under a 10-fold load (21600 g) (hereinafter referred to simply as "10×MI"), that is, (10×MI/MI). In the POM copolymer substantially free from a branched structure used in the present invention, this ratio (10×MI/MI) is 25 or less, preferably 20 or less. The higher the degree of branching, the higher the ratio. When the ratio is 25 or more, a blow or extrusion molding product can be successfully provided, but surface deterioration is liable to occur due to the presence of particulates in gel form, so that the resultant molding is poor in the properties, particularly toughness.

In the present invention, the blow molding can be conducted on a molding machine used in the blow molding of the conventional thermoplastic resin according to a conventional method. Specifically, the blow molding is conducted by plasticizing the abovedescribed POM copolymer resin or a composition thereof on an extruder or the like, extruding or injecting the copolymer resin through a annular die to form a molten or softened intermediate parison, inserting the parison into a mold, blowing a gas into the inside of the parison to fill out the parison, and cooling the molding for solidification, thereby forming a hollow molding. Regarding the conditions for molding the POM copolymer resin of the present invention, the cylinder temperature and die temperature are each preferably 185° to 230° C., particularly preferably 190° to 220° C. The mold temperature is preferably 50° to 90° C., particularly preferably 65° to 85° C. Although the gas to be blown into the parison may be air, nitrogen or any other gas, air is usually employed from the economic viewpoint. The blowing pressure is preferably 3 to 10 kg/cm². Further, it is also possible to conduct the molding on a special blow molding machine, such as a three-dimensional blow molding machine. Further, the composition of the present invention in the form of a single layer or a multilayer may be combined with a layer of other material, such as polyolefin or polyester, to form a multilayer blow molding product.

In the extrusion molding according to the present invention, the POM copolymer resin or a composition thereof is plasticized on an extruder and continuously extruded through a die. The extruded molten resin is continuously molded into round rods, square timbers, pipes, sheets, films, etc., or rods or tubes having irregular sections according to the purpose depending upon the extruding nozzle. The temperature of the extruding machine preferably falls within the same temperature region as that used in the blow molding.

The blow molding or extrusion molding wherein use is made of a specified polyoxymethylene copolymer resin or a composition thereof according to the present invention contributes to an improvement in the melt tension over the conventional polyoxymethylene resin or a composition thereof, is free from drawdown of a parison during blow molding and contributes to a remarkable improvement in the blow moldability, so that it is possible to provide containers and other hollow moldings each having an even wall thickness and a good appearance and hollow materials excellent in the mechanical properties, chemical resistance, etc., and suitable for use as the materials of containers and piping, such as fuel tanks of automobiles, and pipes. In extrusion molding as well, no drawdown occurs during melting, and it is possible to efficiently provide rod-shaped moldings, such as round rods and pipes, sheets, films, etc., so that stocks having no significant void and excellent in the mechanical properties and machinability can be provided.

acid undetected), that is, $4 \times 10^{-3}\%$ by mole in total. As shown in Table 1, in some examples, a chain transfer agent (methylal) was added thereto.

The reaction product (about 90° C.) discharged from a discharge port of the polymerizer was immediately mixed with an aqueous solution containing 1000 ppm of triethylamine and having a temperature regulated to a suitable value (finally in an amount of about 4 times that of the reaction product). After the mixture was pulverized and discharged, it was cooled under the conditions specified in Table 1 and agitated for 60 min. Then, it was centrifuged and dried to provide a copolymer.

Subsequently, 0.4 part by weight of pentaerythrityl tetrakis[3-(3,5-di-tert-butyl-4-hydroxyphenyl)propionate] (Irganox 1010 manufactured by Ciba-Geigy Limited) and 0.2 part by weight of melamine were added as a stabilizer to 100 parts by weight of the copolymer, and the mixture was melt-kneaded at 200° C. on a vented extruder to provide a stabilized resin composition in pellet form. The MI value and 10×MI/MI value of this composition are given in Table 1 together with the variation of the polymerization conditions.

TABLE 1

| | Prodn. Ex. | | | | | | | |
|---|---|---|---|---|---|---|---|---|
| | 1 | 2 | 3 | 4 | 5 | 6 | 7 | 8 |
| Catalyst (mol %) | $5 \times 10^{-3}$ | $1 \times 10^{-3}$ | $5 \times 10^{-3}$ | $5 \times 10^{-3}$ | $5 \times 10^{-3}$ | $5 \times 10^{-3}$ | $5 \times 10^{-3}$ | $5 \times 10^{-3}$ |
| Chain transfer agent (mol %) | — | — | $5 \times 10^{-3}$ | — | $5 \times 10^{-3}$ | — | $5 \times 10^{-3}$ | — |
| Other additives (mol %) | — | — | — | — | — | — | — | branching agent |
| Temp. conditions after polymn. | | | | | | | | |
| 45° C./Time taken (sec) | 45/20 | " | " | 45/30 | " | 45/60 | 45/60 | 45/30 |
| Final temp. (°C.)/Time taken (sec) | 30/30 | " | " | 30/45 | " | 30/360 | 30/360 | 30/45 |
| Copolymer MI (g/10 min) | 0.2 | 0.6 | 1.5 | 1.0 | 1.9 | 2.8 | 3.5 | 0.7 |
| Copolymer 10 × MI/MI | 20 | 19 | 18 | 19 | 18 | 18 | 18 | 38 |

[EXAMPLES]

The effect of the present invention will now be described in more detail with reference to the following Examples, though it is not limited to these Examples only.

Preparation of POM Copolymer

Production Examples 1 to 8

In these Examples, use was made of a continuous mixer-reactor comprising a barrel having a cross-section comprising two circles partly overlapping with each other and externally provided with a jacket for passing a heating (or cooling) medium therethrough and internally provided in the longitudinal direction with two rotating shafts having a paddle for agitation and propulsion purposes. A hot water at 80° C. was passed through the jacket, and the two rotating shafts were rotated at 100 rpm. Trioxane containing 3.3% by mole of 1,3-dioxolane was continuously fed to one end of the reactor, and a dibutyl etherate of boron trifluoride in an amount specified in Table 1 based on the total amount of the monomers (trioxane plus 1,3-dioxolane) was simultaneously fed in the form of a 1% cyclohexane solution in a continuous manner from the same position of the reactor to conduct copolymerization.

Active impurities in the whole monomer used in the present experiment were analyzed and found to be $3 \times 10^{-3}\%$ by mole of water and $1 \times 10^{-3}\%$ by mole of methanol (formic Examples 1 to 5 and Comparative Examples 1 to 3

The POM copolymer pellets prepared in the above Production Examples were subjected to measurement of MI value and melt tension by the following methods. Further, a cylindrical container was molded on a blow molding machine (SS-45ND manufactured by Placo Co., Ltd.) under the conditions of a cylinder temperature of 200° C., a die (diameter: 50 mm, interval: 3 mm) temperature of 200° C., a mold temperature of 70° C. and a blowing pressure of 5 kg/cm² to evaluate the moldability [drawdown, breaking during blowing, evenness of wall thickness, and appearance (roughness and unevenness of surface)]. The evaluation results are given in Table 2.

Property values were evaluated by the following methods.

1) MI value:

10 g of the pellets provided in each Production Example were placed in a Model MX101 melt indexer manufactured by Takara Kogyo K.K., left in a molten state in the melt indexer at 190° C. for a given period of time and passed through an orifice having an inner diameter of 2.09 mm to determine the weight (MI value) per 10 min of the resin flowing through the oritice under a load of 2.16 kg. Further, the value of 10× MI was determined in the same manner as that described above, except that the load was 21.6 kg (10-fold load), thereby calculating the value of 10×MI/MI.

2) Melt Tension:

A load necessary for taking up a resin flowing at 190° C.

through an orifice having a diameter of 1 mm at a pulldown ratio of 10 was measured in a load cell by using a capillary rheometer (manufactured by Toyo Seiki Seisaku Sho, Ltd.).

3) Blow Moldability:
Drawdown

Extrusion was conducted on a blow molding machine until the length of the parison reached 120 mm, and the length of the parison 10 sec after the extrusion was measured. The drawdown was evaluated as "very small" when the length of the parison was 130 mm or less, "small" when the length of the parison was 130 to 150 mm and "large" when the length of the parison was 150 mm or more. When the parison was cut and dropped under the weight of the parison per se, the drawdown was evaluated as "DD".

4) Evenness of Thickness of Molded Product:

The molded product was cut, and the thickness of each of the upper, center and lower portions was measured with a micrometer to determine the variation in the thickness (the percentage of the difference between the maximum value and the mininum value based on the average wall thickness).

5) Breaking during Blowing:

Whether or not breaking of the material occurred during molding was observed with the naked eye. 6) Appearance:

The surface lubricity (evenness of gloss, roughness, etc.) was observed with the naked eye.

In particular, although the pellet prepared in the Production Example 8 exhibited a substantially good extrudability, the surface of the molded article was rough and, at the same time, the presence of voids was observed in the inside thereof.

What we claim is:

1. A process for producing a hollow blow-molded or extrusion-molded article which comprises blow-molding or extrusion-molding a composition which is comprised of a polyoxymethylene copolymer resin having a substantially linear molecular structure and a melt flow index (MI) value, as measured at 190° C. and a load of 2160 g, of 0.1 to 2.0 g/10 min, and wherein the polyoxymethylene copolymer resin is prepared by, (a) forming a polymerization reaction system comprised of trioxane as a principle monomer together with a cyclic ether or cyclic formal comonomer on the presence of $1 \times 10^{-3}$ to $1 \times 10^{-2}$ molar %, based on the total of the trioxane monomer and cyclic ether or cyclic formal comonomer present in the polymerization reaction system, of a catalyst comprising boron trifluoride or a coordination compound thereof;

(b) copolymerizing the trioxane monomer and cyclic ether or cyclic formal comonomer while regulating impurities having a chain-terminating or chain-transferring effect in the polymerization reaction system to $1 \times 10^{-2}$ molar % or less based on the total of the trioxane monomer and cyclic ether or cyclic formal comonomer present in the polymerization reaction system, and then (c) deactivating the catalyst by cooling the polymerization reaction system to a temperature of 45° C. or below within 30 seconds after completion of copolymerization.

2. A process as in claim 1, wherein the polyoxymethylene copolymer resin is stabilized by adding at least one stabilizer compound selected from the group consisting of hindered phenols, nitrogenous compounds, alkali or alkaline earth metal hydroxides, inorganic salts and carboxylic acid salts.

TABLE 2

|  | Ex. | | | | | Comp. Ex. | | |
| --- | --- | --- | --- | --- | --- | --- | --- | --- |
|  | 1 | 2 | 3 | 4 | 5 | 1 | 2 | 3 |
| Pellet used | Prodn. Ex. 1 | Prodn. Ex. 2 | Prodn. Ex. 3 | Prodn. Ex. 4 | Prodn. Ex. 5 | Prodn. Ex. 6 | Prodn. Ex. 7 | Prodn. Ex. 8 |
| MI (g/10 min) | 0.2 | 0.6 | 1.5 | 1.0 | 1.9 | 2.8 | 3.5 | 0.7 |
| Melt tension (g) | 13.8 | 10.8 | 4.2 | 7.0 | 3.0 | 0.9 | 0.6 | 12.2 |
| Blow moldability (drawdown) | very small | small | small | very small | small | large | DD | small |
| Evenness of thickness (%) | 8 | 10 | 15 | 13 | 18 | — | molding failed | 23 |
| Breaking during blowing | none | none | none | none | none | occurred | | none |
| Appearance | good | good | good | good | good | — | | poor |

Examples 6 co 10 and Comparative Examples 4 to 6

The pellets prepared in the Production Examples 1 to 8 were melt extruded under the conditions of a cylinder temperature of 200° C. and a die (diameter: 20 mm) temperature of 200° C. and cooled with water while pulling the extruded resin at a constant rate to mold a round rod.

The pellets prepared in the Production Examples 1 to 5 exhibited a substantially good extrudability, and the molded products were excellent also in the shape and appearance. On the other hand, all the pellets prepared in the Production Examples 6 and 7 could not provide round rods having an even shape due to drawdown and had voids in the inside thereof.